Figure 1:
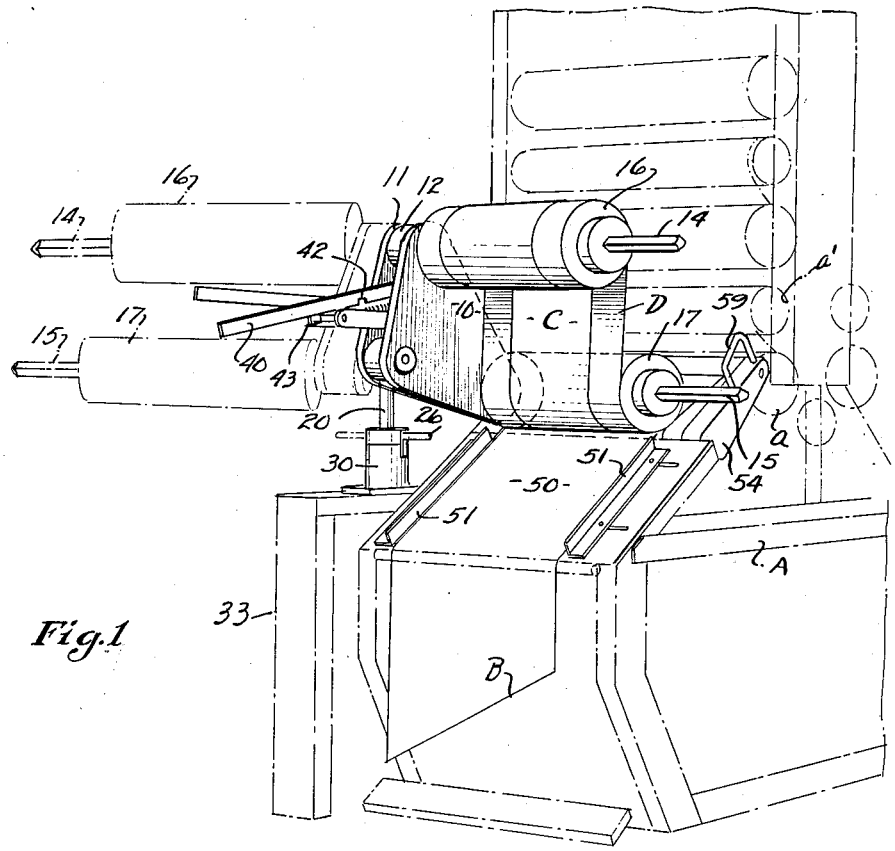

July 29, 1952 — H. C. BOSTWICK — 2,605,196
APPARATUS FOR APPLYING SQUEEGEE STRIPS TO TIRE FABRICS
Filed June 1, 1949 — 4 Sheets-Sheet 1

INVENTOR.
HENRY C. BOSTWICK
BY
Bates, Teare, & McLean
Attorneys

July 29, 1952          H. C. BOSTWICK          2,605,196

APPARATUS FOR APPLYING SQUEEGEE STRIPS TO TIRE FABRICS

Filed June 1, 1949          4 Sheets-Sheet 2

INVENTOR.
HENRY C. BOSTWICK
BY
Bates, Teare, y McLean
Attorneys

INVENTOR.
HENRY C. BOSTWICK
BY
Bates, Teare, & McBean
Attorneys

July 29, 1952 H. C. BOSTWICK 2,605,196
APPARATUS FOR APPLYING SQUEEGEE STRIPS TO TIRE FABRICS
Filed June 1, 1949 4 Sheets-Sheet 4

INVENTOR.
HENRY C. BOSTWICK
BY
Bates, Teare, & McKean
Attorneys

Patented July 29, 1952

2,605,196

UNITED STATES PATENT OFFICE 2,605,196

APPARATUS FOR APPLYING SQUEEGEE STRIPS TO TIRE FABRICS

Henry C. Bostwick, Coventry Township, Summit County, Ohio, assignor to The Akron Standard Mold Company, Akron, Ohio, a corporation of Ohio Application June 1, 1949, Serial No. 96,562

12 Claims. (Cl. 154—10)

This invention is concerned with the application of a squeegee strip to a fabric strip to be used in building a tire, the squeegee strip being fed into contact with the usual fabric strip as the same is moving to a place of use or storage as, for instance, a servicing machine.

Heretofore the practice has been to put the squeegee strip in contact with the fabric strip moving into the servicer and by this frictional engagement pull the squeegee strip off its supply roll. This, however, stretched the fabric strip, which was detrimental as it changed the angles of the cords in the fabric, resulting in a weakening of the tire subsequently produced. An object of my invention is to provide for such application of the squeegee strip to the fabric strip without effecting distortion of the fabric strip.

I avoid the stretching of the main strip as the squeegee strip is applied to it, by providing an intermediate mechanism between the main fabric strip moving into the servicer and the squeegee strip coming off its supply roll, this intermediate mechanism positively feeding the squeegee strip onto the main strip at the same speed as that at which the latter is advancing.

The particular apparatus illustrated in the drawing and hereinafter described for performing the above outlined operation is also included within my invention. The drawings disclose my squeegee applying apparatus in conjunction with the servicing machine of the type shown, for instance, in my Patent 2,242,810 issued May 20, 1941, so that the squeegee strip is applied to the fabric strip as they are moving onto the stock receiving roll of the servicing machine.

Figure 2:
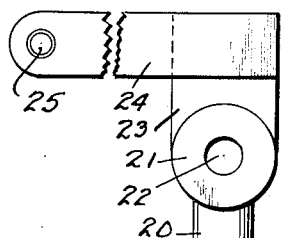
Figures 3, 4:
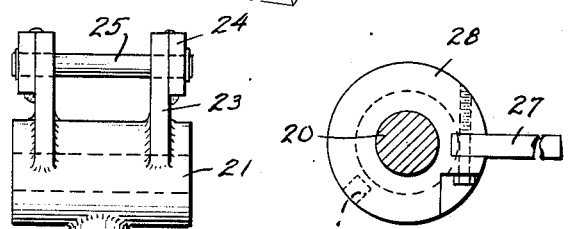
Figure 5:
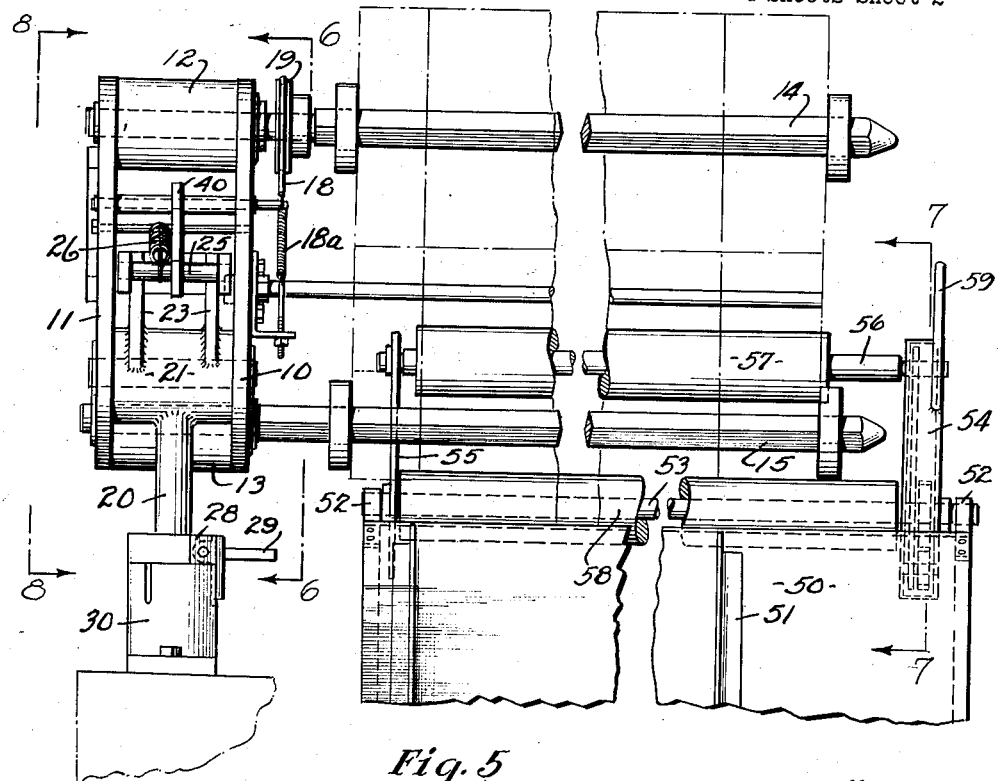
Figures 6, 7:
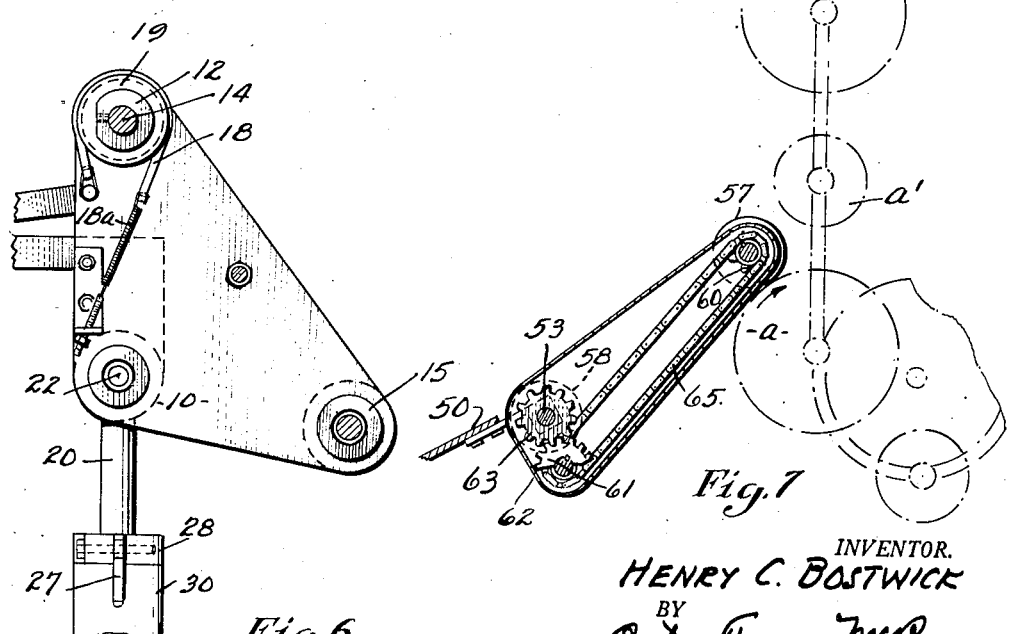
Figure 8:
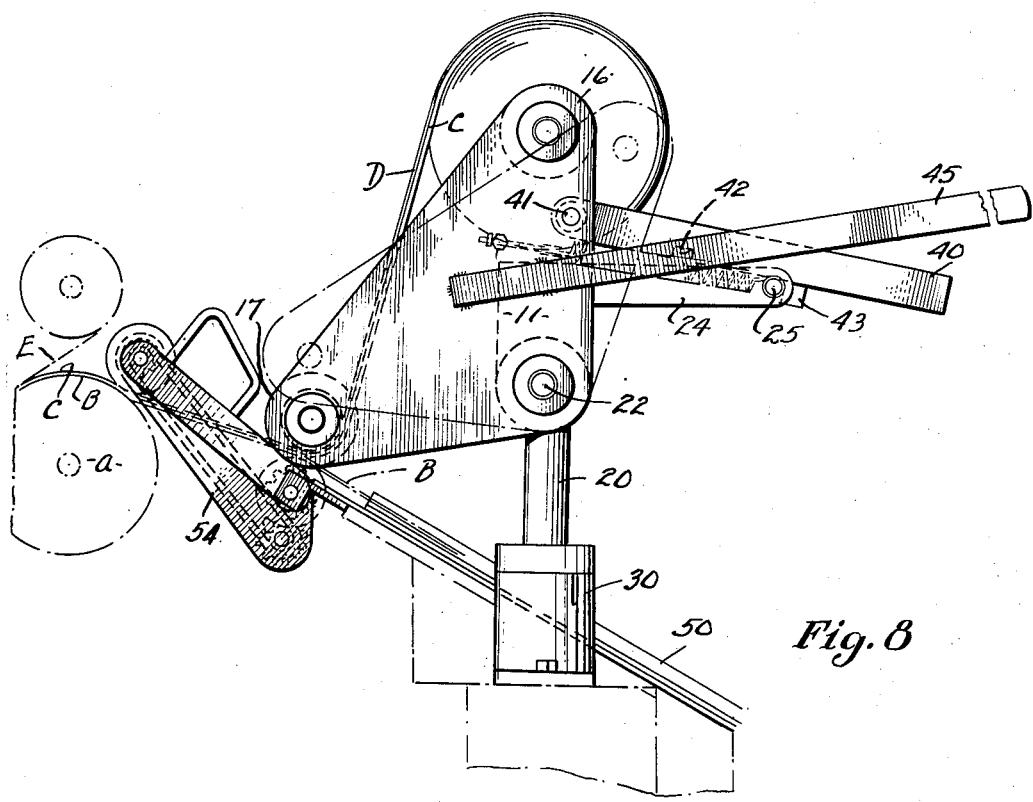
Figure 9:
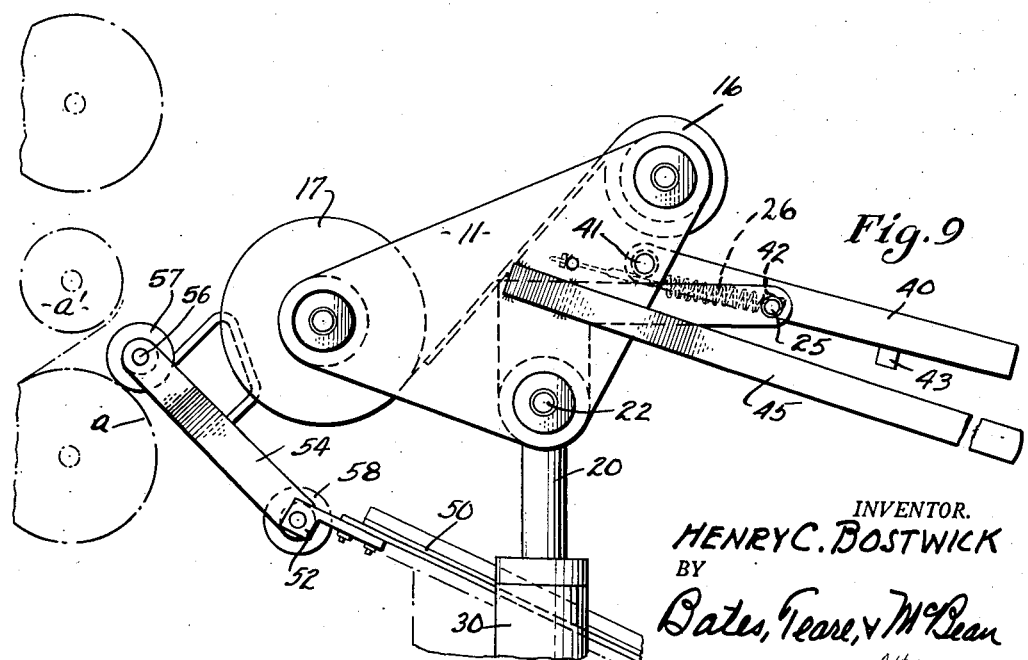
Figure 10:
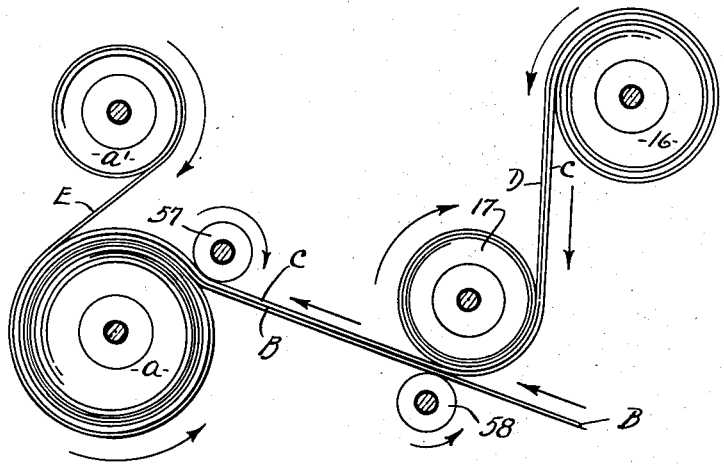
Figure 11:
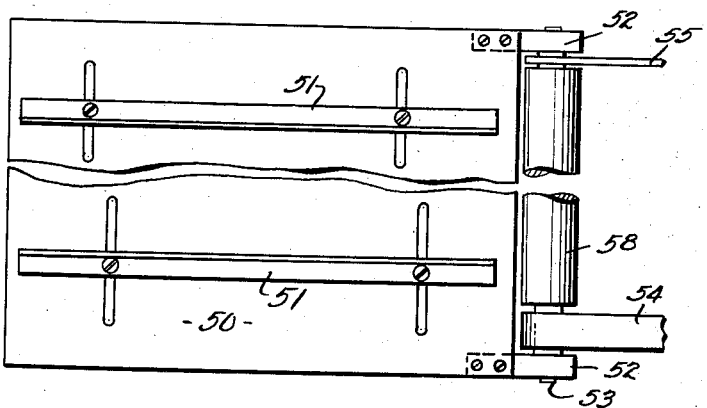
Figure 12:
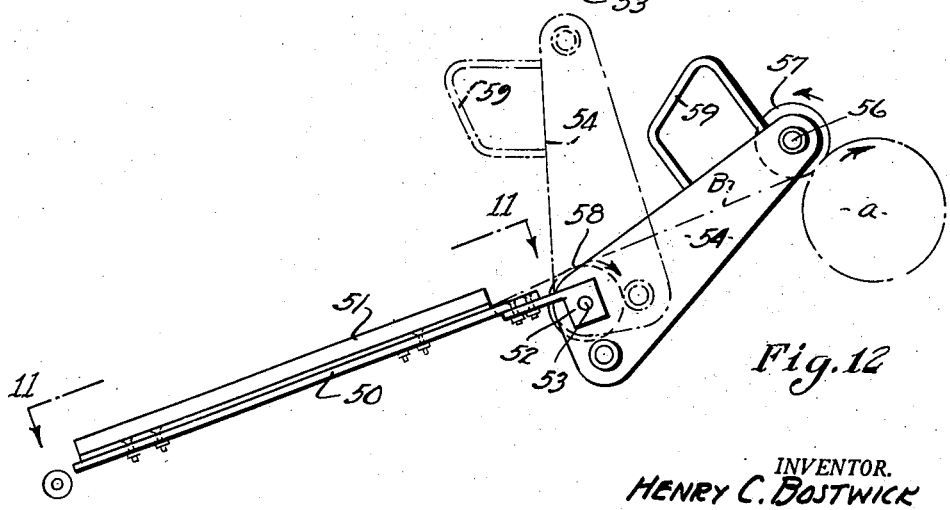

In the drawings, Fig. 1 is a front elevation of the squeegee apparatus in position in front of a servicing machine outlined in broken lines; Fig. 2 is an elevation of the swivel support for the squeegee apparatus; Fig. 3 is an elevation of the same parts in position at right angles to Fig. 2; Fig. 4 is a horizontal section on the line 4—4 on Fig. 2; Fig. 5 is a front elevation partly broken away of the squeegee apparatus in position to coact with the servicing machine; Fig. 6 is a vertical section through the roll-supporting shafts of the squeegee apparatus, as indicated by the line 6—6 on Fig. 5; Fig. 7 is a vertical section (indicated by the line 7—7 on Fig. 5) through the transmission mechanism for feeding the squeegee strip by means of the rotation of a stock roll of a servicing machine, portions of the servicing machine being shown in broken lines; Figs. 8 and 9 are end elevations of the squeegee apparatus, the position being indicated by the line 8—8 on Fig. 5, Fig. 8 being in the active position and Fig. 9 in idle position, each of these views showing portions of the servicing machine in broken lines; Fig. 10 is a diagram illustrating the operation of the squeegee apparatus in conjunction with the servicing machine; Fig. 11 is a plan, intermediately broken out, of the feeding table and driven roller for conducting the main strip and the squeegee strip to the servicing machine, the position of this plan being indicated by the line 11—11 on Fig. 12; Fig. 12 is an elevation of the stock feeding table and the squeegee strip drive, showing the drive in its active position in full lines, and in an inactive position in broken lines.

In Fig. 1, I have shown in broken lines a servicing machine designated A having a number of strip carrying rolls $a$ each associated with a liner-carrying roll $a'$, having a wound-up canvas liner anchored to the roll $a$. Means not shown, but illustrated for instance in my patent heretofore mentioned, rotates the lowermost roll $a$ so a fabric may be wound up with an interposed canvas liner on such roll $a$. When a roll $a$ has been loaded, the set of rolls may be shifted to bring a succeeding roll into the lower-most position for loading. My squeegee apparatus coacts with the bottom-most strip roll $a$ to cause the squeegee strip to be wound up on such roll in conjunction with the normal fabric strip B as the same passes to the upper region of such bottom-most roll $a$.

The squeegee strip C is mounted with a canvas liner D on two rolls which are held in a carrying apparatus which is swiveled on a vertical axis at the side of the servicing machine. This enables the loaded squeegee apparatus to be swung from the idle position shown in broken lines in Fig. 1 to the active full-line position. When in its active position the intermediate transmission mechanism between the lower squeegee roll and the lowermost stock roll also becomes active. This transmission mechanism, as hereinafter more fully explained, has a driving roller opposed to the stock-receiving roll of the servicing machine and thus frictionally engages the main fabric strip and the surmounting squeegee strip as they pass into the servicing machine, and this driving roller through suitable gearing operates, at the same peripheral speed, a roller coacting with a roll in the squeegee apparatus and effecting a positive drive of the squeegee strip therefrom.

The roll-carrier of the squeegee apparatus comprises a pair of spaced plates 10 and 11, between which are a pair of rigidly mounted distance sleeves 12 and 13. In these sleeves are journaled cantilevered shafts 14 and 15 which carry respectively a pair of rolls 16 and 17. The roll 16 is the roll which carries the wound-up squeegee strip C and the interposed sheet liner D, the lower end of which is attached to the roll 17. The roll 17 thus serves as a take-up roll for the squeegee liner D when the squeegee itself is delivered from the liner D to the main strip B passing to the roll a in the servicing machine.

I provide a suitable brake restricting the free rotation of the squeegee supply roller 16. As shown in Figs. 5 and 6 this brake comprises an anchored strap 18 embracing a grooved pulley 19 tight on the shaft 14, the strap being tensioned by a spring 18a adjustably anchored to the frame 10, 11.

The frame 10, 11, 12 and 13 is pivoted at 22 to a transverse sleeve 21 fixedly secured to the top of a vertical cylindrical standard 20 which is swivelly mounted in a stationary tubular bearing bracket 30, rigidly mounted on the top of any suitable support, as the support 33 shown in broken lines in Fig. 1. The post 20 has a suitable thrust bearing and a bearing for rotary movement in the tubular bracket 30. I have shown two roller bearings 31 and 32 for effecting such swiveled support.

Extending upwardly from the swiveled sleeve 21 are a pair of rigid arms 23 which have welded to them forwardly extending arms 24, Figs. 2 and 3, these forwardly extending arms carrying a cross pin 25 with which coacts a locking bar pivotally connected to the rocking frame 10, 11. Such bar is shown at 40 in Figs. 1, 8 and 9. It is pivoted to the frame at 41. It has on its underside a shoulder shown as provided by a notch 42 and has a downwardly projecting stop 43. In the idle position of the parts the notch 42 embraces the cross pin 25, as shown in Fig. 9. A tension spring 26 between the frame 10, 11 and the cross pin 25, brings the frame when released to the idle position of Fig. 9.

To place the frame 10, 11 in its active position, it is swung by the lifted rod 40 about the pivotal axis 22 until the stop 43 engages the outer surface of the pin 25 and thus prevents further swinging.

A rod 45 welded to frame plate 11 and projecting forwardly furnishes means for manually turning the whole squeegee apparatus on its vertical axis to carry it from the idle or loading position shown in broken lines in Fig. 1 to the active position shown in full lines in that figure. The frame and its squeegee rolls may be locked in either the loading or the active position by means of a latch 29 pivoted at 27 to a collar 28 rigid on the rotary post 20. This latch has a depending arm which is adapted to be held by gravity in either of two notches 35 or 36 in the tubular pedestal 30.

Suitably mounted on the servicing machine, or other apparatus with which the squeegee strip is used, is a table 50 provided with suitable side guides 51. The fabric strip is fed along this table to its position of use or storage, as for instance, the roll a in Fig. 1.

Rigid with the table 50 are a pair of brackets 52 carrying a transverse shaft 53 on which is pivotally secured a hollow frame 54, and at the other end an arm 55. The frame 54 and arm 55 carry a shaft 56 carrying a roller 57 which may bear against the material on the lowermost servicing supply roll a. Around the shaft 53 is a roller 58 of the same diameter as the roller 57. The roller 58 is suitably geared with the roller 57 in a manner to cause the roller 58 to move at the same peripheral speed as the roller 57 whenever the latter is turned by the rotative action of the stock roll a. The fabric strip B passes upwardly from the table 50 across the topmost surface of the roller 58 and thence onto the underside of the roller 57 so that it is pressed between the roller 57 and the roller a.

The take-up roll 17 with the squeegee liner wound upon it and the squeegee strip extending beneath it coacts with the roller 58 to press between these rolls the fabric strip B and the squeegee strip C and its liner D, as illustrated in the diagram Fig. 10. At the same time the roller 57 is coacting with the roller a to press between them the fabric B and the squeegee strip C. As the roller a is rotated by a mechanism carried in a servicing machine to carry its top portion away from the table 50, thus winding up the fabric strip B, such movement rotates the roller 57 so that its lowermost surface engaging the squeegee strip is traveling in the same direction and at the same speed as the fabric strip at that point. The gearing between the roller 57 and the roller 58 causes the roller 58 and hence the take-up roll 17 to rotate so that their adjacent surfaces travel in the same direction and at the same peripheral speed as the rollers a and 57.

It results from the above-described transmission mechanism that the squeegee strip is laid on the fabric strip as the same travels to the stock roll at the same speed as the fabric strip is traveling so that no strain is placed on the fabric strip and no tendency to stretch it.

The gearing heretofore mentioned between the rollers 57 and 58 comprises a sprocket 60 rigid with the roller 57, a sprocket of the same size 61 rigid with a gear 62 which meshes with a gear of the same size 63 on the roller 58. A sprocket chain 65 connects the sprockets 60 and 61. This mechanism, as already mentioned, causes the roller 58 to be rotated by the roller 57 at the same peripheral speed but in the opposite direction. Thus the undersurface of the roller 57 and the upper surface of the roller 58, both of which coact with the fabric strip B and the superimposed squeegee strip C, are necessarily moving in the same direction and at the same speed.

In the idle position of the squeegee apparatus the gear housing 54 is swung back into idle position. We provide the housing with a bail or handle 59 by which it may be manually turned on the pivotal axis into the position shown in broken lines in Fig. 12. When the squeegee apparatus is not to coact with the servicing machine, the gear housing 54, the roller 57 and the supporting arm 55 at the opposite end of the roller are swung back to the idle position shown in broken lines in Fig. 12, thus leaving the servicing machine in normal condition for use in the ordinary manner with stock passing over the table but without the application of the squeegee strip.

When the squeegee strip is to be applied the roller 57 and its carrying arms is swung into the position indicated in Fig. 1 and in full lines in Fig. 12, and then the loaded squeegee apparatus is swung about the vertical axis of the stem 20 to bring the apparatus into the position shown in full lines in Fig. 1, where the take-up roller 17 automatically comes over the driven roller 58 in position to coact therewith through the intermediacy of the fabric strip B and the squeegee strip C as they pass to the servicing roll a.

I may recapitulate the travel of the different fabrics, illustrated by the diagram (Fig. 10) as follows:

As the stock fabric B goes to the stock roll a, it is surmounted by the squeegee strip C from the squeegee roll 16 at the same time as the stock and squeegee strips are wound up on the stock roll. A liner strip E from the liner roller a' is wound up with the stock and surmounting squeegee strip, and as the squeegee strip C is pulled off of its roll its liner D is wound up on the liner roll 17. The friction roll 57 coacts with the roll a to press the fabric B and squeegee C between them. This drives the roll 57. The roll 57 is geared with the roll 58 to drive it in the opposite direction at the same peripheral speed. The roll 58 engages the underside of the fabric strip and presses it, the squeegee and the squeegee liner between this roll and the roll 17. Accordingly, the squeegee strip is pulled off of its roll at the same speed that the fabric strip is advanced to the stock roll, and there is no stretching of the stock material.

It will be seen that I have devised a simple apparatus, provided with a squeegee carrying roll and a liner roll therefor, adapted to be mounted adjacent a standard servicing machine, and operating whenever desired to carry a roll with a squeegee strip into coaction with transmission mechanism readily placed between an ordinary feed table and the receiving roll of the servicing machine, for causing the squeegee strip to adhere to the fabric strip without stretching or otherwise distorting the fabric strip, as they pass to the servicing machine. My apparatus is simple in construction and readily applied to existing servicing machines of various types. It may also be used if desired for feeding the squeegee strip to the fabric strip as the same passes to other means of use than a servicing machine, as, for example, directly to a tire building drum in position to receive the stock, in place of the lowermost servicing roll, as shown in the drawings.

I claim:

1. The combination of a servicing machine having a stock roll and mechanism for rotating it to wind up a stock fabric strip, means for carrying a wound-up squeegee strip, an unwound portion of which may engage the stock fabric strip in advance of its passage to the stock roll, a roller coacting with the stock roll and rotated thereby, a second roller compressing the squeegee strip and stock fabric against a roll of the squeegee apparatus, and means driven by the first-mentioned roller for rotating said second roller at the same peripheral speed as the first roller.

2. The combination of a roll adapted to wind up a main stock strip, a roll carrying a squeegee strip, an unwound portion of said squeegee strip being adapted to engage the stock strip in advance of the wind-up roll for the stock strip, two rollers, one engaging the top surface of the squeegee strip on the main strip and forcing the main strip against the wind-up roll therefor and the other engaging the undersurface of the main strip and forcing the squeegee strip thereon against a counter-pressure roller for the squeegee strip, and means for rotating two said rollers in the opposite direction at the same peripheral speed.

3. In the combination, with a roll adapted to receive a stock strip surmounted by a squeegee strip, a roller acting in opposition to said roll and engaging the squeegee strip and stock strip between them, a roll carrying a wound-up squeegee strip and liner, a take-up roll for said liner, a second roller adapted to engage the under-surface of the stock strip and compress it and the squeegee against the take-up roll of the squeegee apparatus, and means for rotating said two rollers at the same peripheral speed and in opposite directions.

4. In the combination, with a roll adapted to receive a stock strip surmounted by a squeegee strip, a roller acting in opposition to said roll and engaging the upper surface of the squeegee strip and the stock strip between them, a roll carrying a wound-up squeegee strip and liner, a take-up roll for said liner, a second roller adapted to engage the under-surface of the stock strip and compress it and the squeegee strip against the take-up roll of the squeegee apparatus, a gear on the under-engaging roller, a second gear meshing with said gear, and an endless sprocket chain connecting sprocket wheels on said second gear and said upper-engaging roller.

5. The combination, with a servicing machine having a wind-up roll and means for rotating it, of a feed table adjacent said roller along which a main stock strip may be fed to the roll, means for carrying a wound-up squeegee strip adapted to overlie the main stock strip on the feed table, transmission mechanism located between the feed table and the wind-up stock roll of the servicing machine, said transmission mechanism including a roller adapted to coact with stock being wound up on the servicing machine to rotate said roller, a second roller adapted to coact with the squeegee strip while the stock strip and squeegee strip engage each other, gearing connecting said rollers in a manner to rotate them in opposite directions at the same peripheral speed, whereby the squeegee strip is positively withdrawn from its support at the same speed as the stock strip is advanced to the servicing machine.

6. The combination of a roll for utilizing a stock strip and a surmounting squeegee strip, a table along which said stock strip may be fed to said roll, a frame pivoted to the end of the table adjacent the stock receiving roll, said frame carrying a roller adapted to engage the stock on said stock-receiving roll, a second roller mounted coaxially with said pivoted frame and adapted to engage the underside of the strip and press it and the surmounting squeegee strip against a take-up roll of the squeegee apparatus, an idler gear meshing with a gear on the last-mentioned roll, and an endless sprocket chain and pair of sprocket wheels respectively on the idler gear and the first-mentioned roller whereby the first-mentioned roller drives the second-mentioned roller at the same speed in the opposite rotary direction.

7. The combination with a movably mounted squeegee apparatus including a roll adapted to carry a wound-up squeegee strip with an interposed liner and a take-up roll for the liner, of means for feeding a main fabric strip, said mounting allowing the take-up roll of the squeegee apparatus to be brought into engagement with the main fabric strip, a roller on the opposite side of the main fabric strip coacting with the liner roller, a roller on the other side of the main fabric strip coacting with the wind-up roll of the servicing machine, whereby the latter roller is rotated by the servicing machine, and gearing connecting the said two rollers, whereby the roller coacting with the wind-up roll of the servicing machine rotates the roller coacting with the squeegee apparatus at the same peripheral speed and in opposite rotative direction.

8. The combination of a squeegee apparatus, comprising a roll adapted to carry a wound-up squeegee strip and a liner, a parallel take-up roll for the liner, means for swively mounting said apparatus so that it may be swung from idle position into position to coact with a machine utilizing a tire strip which the squeegee strip surmounts, a roller coacting with a roll of said machine to press the fabric strip and squeegee strip between them and be rotated by the advancing of said strips, a second roll on the underside of the fabric roll coacting with the take-up roll of the squeegee apparatus to press the tire strip and surmounting squeegee strip between them, and gearing between said upper and under rolls causing the under roll to rotate at the same peripheral speed as the upper roll and in the opposite direction.

9. The combination, with means for progressing a stock strip of fabric surmounted by a squeegee strip, of a swively mounted squeegee apparatus adapted to carry a wound-up squeegee strip and adapted to be swung on its swivel axis to present the squeegee strip to said fabric strip while the latter is unwound, and means for positively unrolling the squeegee strip from the squeegee apparatus controlled by the means for progressing the stock strip.

10. In a squeegee carrying apparatus, the combination of a support, a standard swiveled therein on a vertical axis, a frame carried by the standard and pivoted thereto to swing on a horizontal axis, a pair of shafts carried by said frame and cantilevered to one side thereof and adapted to carry a squeegee roll and a liner roll, and a bar connected to the swinging frame and adapted to swing it on its pivot and provided with a shoulder adapted to coact with the stationary portion of the swiveled frame to hold the swinging frame in a predetermined position.

11. The combination with means for progressing a main fabric strip toward a fabric-receiving apparatus, a squeegee apparatus having a roll carrying a wound-up squeegee strip with a free unwound portion in face engagement with said fabric strip, a roller engaging the fabric strip at its point of engagement with said unwound free portion of the squeegee strip, means urging said roller against the fabric strip and unwound free portion of the squeegee strip, and means under control of said fabric progressing means for rotating the roller to unwind and feed the squeegee strip onto the fabric strip while urging both strips toward the fabric receiving apparatus at the same speed as the fabric strip is advanced.

12. In an apparatus for feeding a squeegee strip to tire fabric, the combination of means for carrying and winding a tire fabric, a roll carrying a wound squeegee strip, means for bringing an unwound portion of the tire fabric into face contact with an unwound free portion of the squeegee strip from the roll, a roller engaging and urging the unwound portion of the tire fabric into engagement with the unwound free portion of the squeegee strip and coacting therewith to unwind the squeegee strip from the roll and onto the fabric, independent means controlled by the tire fabric winding means for rotating the roller to positively push the fabric and squeegee strip at the same speed towards the fabric winding means.

HENRY C. BOSTWICK.

REFERENCES CITED

The following references are of record in the file of this patent:

UNITED STATES PATENTS

| Number | Name | Date |
| --- | --- | --- |
| 290,553 | Edson | Dec. 18, 1883 |
| 788,133 | Harrison et al. | Apr. 25, 1905 |
| 1,818,459 | Bryan | Aug. 11, 1931 |
| 2,039,532 | Heston | May 5, 1936 |
| 2,041,990 | Breth et al. | May 26, 1936 |
| 2,343,954 | Carlin | Mar. 14, 1944 |
| 2,346,903 | Caffrey | Apr. 18, 1944 |
| 2,395,020 | Sternad | Feb. 19, 1946 |